US011544613B2

(12) United States Patent
Olivadese et al.

(10) Patent No.: US 11,544,613 B2
(45) Date of Patent: Jan. 3, 2023

(54) CONTROLLING A QUANTUM COMPUTING DEVICE BASED ON PREDICTED OPERATION TIME

(71) Applicant: International Business Machines Corporation, Armonk, NY (US)

(72) Inventors: Salvatore Bernardo Olivadese, Stamford, CT (US); Daniela Florentina Bogorin, Syracuse, NY (US); Nicholas Torleiv Bronn, Long Island City, NY (US); Sean Hart, Tarrytown, NY (US); Patryk Gumann, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 497 days.

(21) Appl. No.: 16/727,157

(22) Filed: Dec. 26, 2019

(65) Prior Publication Data
US 2021/0201187 A1   Jul. 1, 2021

(51) Int. Cl.
*G06N 10/00* (2022.01)
*G06N 20/00* (2019.01)
*G06N 3/08* (2006.01)

(52) U.S. Cl.
CPC .............. *G06N 10/00* (2019.01); *G06N 3/08* (2013.01); *G06N 20/00* (2019.01)

(58) Field of Classification Search
USPC ......................................................... 706/62
See application file for complete search history.

(56) References Cited

U.S. PATENT DOCUMENTS

| RE41,900 E | 10/2010 | Tucci |
| 9,940,212 B2 | 4/2018 | Kelly |
| 9,953,269 B2 | 4/2018 | Chow et al. |
| 10,282,675 B2 | 5/2019 | Bloom et al. |
| 10,304,004 B2 | 5/2019 | Chow et al. |
| 10,325,218 B1 * | 6/2019 | Zeng ............... G06N 10/00 |

(Continued)

FOREIGN PATENT DOCUMENTS

EP   1395947 A2   3/2004

OTHER PUBLICATIONS

International Search report and written opinion received for PCT application serial No. PCT/EP2020/085924 dated Apr. 6, 2021, 9 pages.

(Continued)

*Primary Examiner* — Bryce M Aisaka
(74) *Attorney, Agent, or Firm* — Amin, Turocy & Watson, LLP

(57) ABSTRACT

Systems, computer-implemented methods, and computer program products that can facilitate determining a state of a qubit are described. According to an embodiment, a system can comprise a memory that stores computer executable components and a processor that executes the computer executable components stored in the memory. The computer executable components can comprise a relation determining component that can determine relation of a status signal of a quantum computing device to a noise value of the quantum computing device. The system can further include an operation time estimator that can estimate an operation time for the quantum computing device based on the relation of the status signal to the noise value.

23 Claims, 10 Drawing Sheets

(56) References Cited

U.S. PATENT DOCUMENTS

| | | | |
|---|---|---|---|
| 2009/0259905 | A1 | 10/2009 | Silva et al. |
| 2018/0260732 | A1* | 9/2018 | Bloom ................. H03K 19/195 |
| 2019/0042966 | A1 | 2/2019 | Hogaboam et al. |
| 2019/0164076 | A1 | 5/2019 | Kim et al. |
| 2019/0165245 | A1 | 5/2019 | Rosenblatt et al. |
| 2019/0258757 | A1* | 8/2019 | Nam ....................... G06N 10/60 |

OTHER PUBLICATIONS

Krantz et al., "A Quantum Engineer's Guide to Superconducting Qubits", arxiv.Org, Cornell University Library, 201 Olin Library Cornell University, DOI: 10.1063/1.5089550, Apr. 13, 2019, 58 pages.

Yan, et al. "Distinguishing Coherent and Thermal Photon Noise in a Circuit Quantum Electrodynamical System." Phys. Rev. Lett. 120, 260504 (2018), https://doi.org/10.1103/physrevlett.120.260504. 12 pages.

Kalra, et al. "Vibration-induced electrical noise in a cryogen-free dilution refrigerator: Characterization, mitigation, and impact on qubit coherence" Review of Scientific Instruments 87, 073905 (2016). https://doi.org/10.1063/1.4959153. 13 pages.

Johnson, et al. "Cryocooler Electromagnetic Compatibility." Cryocoolers 8, Plenum Publishers, New York, 1995, pp. 209-220. 12 pages.

Karatsu, et al. "Mitigation of Cosmic Ray Effect on Microwave Kinetic Inductance Detector Arrays." Appl. Phys. Lett. 114, 032601 (2019).

Van Meter, et al. "Fault-tolerant quantum computers." arXiv:0906.2686v2 [quant-ph] Sep. 17, 2009. 69 pages.

Bacon "CSE 599d—Quantum Computing Fault-Tolerant Quantum Computation and the Threshold Theorem." Department of Computer Science & Engineering, University of Washington, 2017, 8 Pages.

NIGG "Towards fault tolerant quantum computation." University of Innsbruck, Dec. 2016. 175 pages.

Anonymous "Distributed Control Servo Module Hardware Implementation." An IP.com Prior Art Database Technical Disclosure, IP.com No. IPCOM000240267D, Jan. 20, 2015. 9 pages.

ANONYMOUS "Machine Learning Algorithms for Smart Meter Diagnostics." An IP.com Prior Art Database Technical Disclosure, IP.com No. IPCOM000242462D, Jul. 16, 2015. 53 pages.

ANONYMOUS "Fit for Purpose Processing in the Quantum World." An IP.com Prior Art Database Technical Disclosure, IP.com No. IPCOM000255049D, Aug. 28, 2018 7 pages.

Olivadese, et al. "Mapping Temperature Distribution in Superconducting Devices." U.S. Appl. No. 16/460,457, filed Jul. 2, 2019. 58 pages.

Olivadese, et al. "On-Chip Thermometer for Superconducting Quantum Computing Devices." U.S. Appl. No. 16/460,572, filed Jul. 2, 2019. 48 pages.

\* cited by examiner

```
System_ready = 0 [initially not ready] [705]

System_ready = Prepare system (calibration) [715]
Signal_S = Read qubits status [operation on fridge] [730]

If Signal_S == 0 [ground state] && System_ready [good calibration]

compile instructions for system* [quantum gates] [710]
    Noise_N = estimate chip noise N [operation on fridge] [720]

if Signal_S/Noise_N >> 1 [740]

System_ready = check_system_status [op on fridge]

if System_ready submit quantum gates [op on fridge] [750]
            [wait coherence time]
            result = Read qubits status [operation on fridge]
            GOTO 5.
        else GOTO 2.
        end
    else GOTO 2.
    end
else GOTO 2.
end
```

FIG. 8

CONTROLLING A QUANTUM COMPUTING DEVICE BASED ON PREDICTED OPERATION TIME

BACKGROUND

The subject disclosure relates to quantum computing, and more specifically, controlling performance of quantum operations.

SUMMARY

The following presents a summary to provide a basic understanding of one or more embodiments of the present disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products can facilitate controlling operational aspects of a QCD.

According to an embodiment, a system can comprise a memory that stores computer executable components and a processor that executes the computer executable components stored in the memory. The computer executable components can comprise a relation determining component that can determine relation of a status signal of a quantum computing device to noise value of the quantum computing device. The system can further include an operation time estimator that can estimate an operation time for the quantum computing device based on the relation of the status signal to the noise value. In some embodiments of the system, the operation time estimator can estimate the operation time based on a comparison of the relation of the status signal to the noise value to a threshold. In some embodiments, the operation time estimator can estimate the operation time for a qubit of the quantum computing device. Alternatively, or additionally, the operation time estimator can estimate the operation time for a connection between two qubits of the quantum computing device. Further, the estimated operation time of the quantum computing device can comprise an estimated coherence time of the quantum computing device.

Additionally, when determining the status signal of the quantum computing device, in accordance with one or more embodiments, a signal value representative of capability to complete a quantum operation by the quantum computing device can be included. In some embodiments, the relation of the status signal to the noise value can be a ratio of a value corresponding to the status signal to the noise value.

In an example implementation, the noise value is representative of a magnitude of interference with completion of a quantum operation by the quantum computing device. In further detail, the noise value can be based on external noise associated with one or more of: physical connections to the quantum computing device, vibrations of the quantum computing device, frequencies of collisions among signals utilized by the quantum computing device, crowding of signals utilized by the quantum computing device, electromagnetic noise to which the quantum computing device is subject, or cosmic radiation to which the quantum computing device is subjected. The interference can also be caused by interference from a decoherence cycle of the quantum computing device, e.g., discussed in connection with FIG. 3 infra. In some embodiments, interference from an external source to which the quantum computing device is subjected is analyzed.

In embodiments of the system with additional features, the noise value determined for the quantum computing device is based on a noise information repository for the quantum computing device. In some implementations, the system can further include a machine learning component, and the noise information repository can be implemented using a neural network that can be updated by the machine learning component. These updates of the neural network can be based on a variety of factors, including, but not limited to, the noise value, the status signal, and a result of the quantum operation performed by the quantum computing device.

In one or more embodiments, the computer executable components can further comprise a controlling component that can control the quantum computing device based on the operation time for the quantum computing device. Processes by which implementations can control the quantum computing device include, but are not limited to, controlling the quantum computing device by pausing a commencing of a quantum operation by the quantum computing device, based on the operation time for the quantum computing device.

In a variation of the operation of the controlling component, the computer executable components of the system can further comprise a checkpointing component that can generate checkpoint data representing a state of the quantum computing device at a time of the pausing the commencing of the quantum operation. The controlling component can further control the quantum computing device by resuming operation of the quantum computing device based on the operation time for the quantum computing device, and the resuming the operation of the quantum computing device can facilitated by the checkpoint data, e.g., by recovering the state of operation of a series of quantum operations at the time of the pausing. Further, the pausing of the operation of the quantum computing device can be to reduce a likelihood of a computation cycle fault in the operation of the quantum computing device.

According to another embodiment, a computer-implemented method can comprise determining, by a system operatively coupled to a processor, relation of a status signal of a quantum computing device to a noise value of the quantum computing device. In one or more embodiments, the method can further comprise estimating, by the system, an operation time for the quantum computing device based on the relation of the status signal to the noise value. In other embodiments, the method can further comprise controlling, by the system, the quantum computing device based on the operation time for the quantum computing device. Further, the controlling the quantum computing device including operations to pause a commencing of a quantum operation by the quantum computing device, based on the operation time for the quantum computing device.

According to another embodiment, a computer program product can facilitate determining a state of the qubit, the computer program product comprising a computer readable storage medium having program instructions embodied therewith, the program instructions executable by a processor to cause the processor to determine relation of a status signal of a quantum computing device to a noise value of the quantum computing device. The program instructions are further executable by a processor to cause the processor to estimate an operation time for the quantum computing device based on the relation of the status signal of the quantum computing device to the noise value of the quantum computing device.

In additional embodiments of the computer program product, the program instructions are further executable by a processor to cause the processor to cause the processor to control the quantum computing device based on the operation time for the quantum computing device. In some implementations of the computer program product, the program instructions executable by a processor to cause the processor to control the quantum computing device include an operation to pause a commencing of a quantum operation by the quantum computing device, based on the operation time for the quantum computing device.

DESCRIPTION OF THE DRAWINGS

FIG. 8 includes an example flowchart that describes the pseudocode of FIG. 7, in accordance with one or more embodiments.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions, e.g., quantum computing can employ quantum physics to encode and process information, rather than binary digital techniques based on transistors. That is, while classical computers can operate on bit values that are either 0 or 1, quantum computers operate on quantum bits that (qubits) can comprise superpositions of both 0 and 1, can entangle multiple quantum bits (qubits), and use interference to affect other qubits. Quantum computing has the potential to solve problems that, due to their computational complexity, cannot be solved, either at all or for all practical purposes, by a classical computer.

A superposition principle of quantum mechanics allows qubits to be in a state that can be described by a linear combination of the 0 and 1 states of the qubit. An entanglement principle of quantum physics can facilitate allowing qubits to be correlated with each other such that the combined states of the qubits cannot be factored into individual qubit states. For instance, a state of a first qubit can depend on a state of a second qubit. As such, a quantum circuit can employ qubits to encode and process information in a manner that can be significantly different from binary digital techniques based on transistors.

Figure 1:
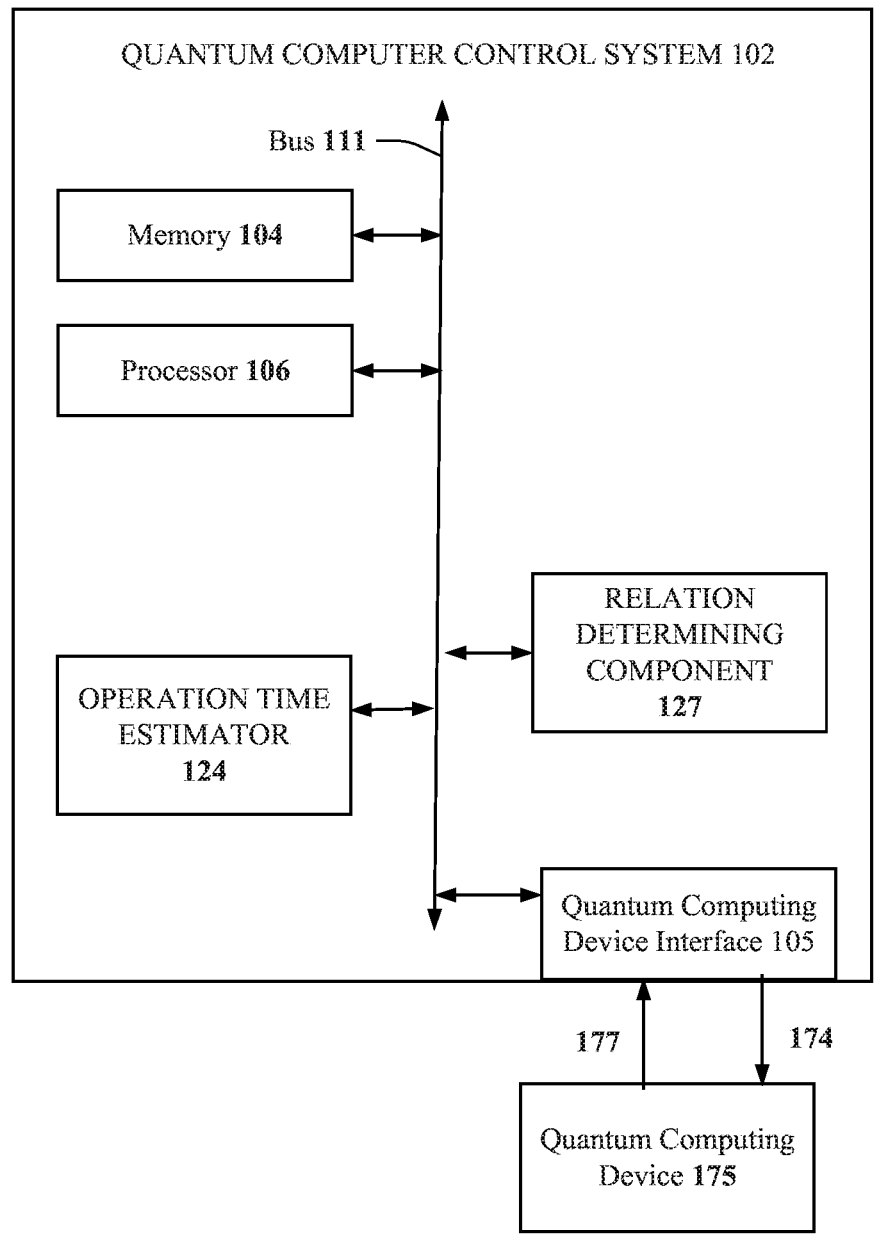
FIG. 1 illustrates a block diagram of an example, a non-limiting quantum computer control system that can facilitate controlling a quantum computing device based on status signals and noise, in accordance with one or more embodiments described herein.

FIG. 1 illustrates a block diagram of an example 100 of non-limiting quantum computer control system 102 that can facilitate controlling a quantum computing device based on status signals and noise values, in accordance with one or more embodiments described herein. The example 100 implementation depicted in FIG. 1 includes quantum computer control system 102 and quantum computing device (QCD) 175.

According to multiple embodiments, quantum computing device 175 can comprise one or more quantum devices or components including, but not limited to, a quantum computer, a quantum processor, a quantum simulator, quantum hardware, a quantum chip (e.g., a superconducting circuit fabricated on a semiconducting device), one or more qubits of a quantum chip, and/or another quantum device.

With respect to the components of quantum computer control system 102 depicted in FIG. 1, it should be noted that because quantum computing devices such as QCD 175 are based on quantum-mechanical phenomena and use quantum physics to encode and process information, QCDs are controlled by classical computing devices such as quantum computer control system 102. As such, quantum computer control system 102 can provide error correction, initialization, calibration, and data management, with embodiments described herein providing additional functions, including but not limited to, increased QCD fault tolerance, a checkpoint/restart system for quantum programs, remote management of multiple quantum computing systems, and automated optimization of computational cycles.

Considering fault tolerance and optimization of computational cycles for example, it should be noted that each executed step performed by components of a QCD (e.g., one or more qubits, and entanglements of qubits) takes place in T2 (coherence) time, that is, a period of time that required elements (e.g., qubits, entanglements) are functioning as designed. By collecting and analyzing different factors that can lead to coherence and decoherence, one or more embodiments can, in some circumstances, enable beginning of execution of a quantum operation as close to beginning of T2 as possible, e.g., increasing optimization of computational cycles. Similarly, by predicting end of T2, this can facilitate avoidance of starting an operation that would be interrupted by the end of T2, e.g., increased fault tolerance. To facilitate different functions of quantum computer control system 102 described and suggested herein, the system 102 can include quantum computing device interface 105 to enable input 174 into and output 177 from QCD 175.

It should be appreciated that embodiments of the subject disclosure depicted in various figures disclosed herein are for illustration only, and as such, the architecture of such embodiments are not limited to the systems, devices, and/or components depicted therein. For example, in some embodiments, quantum computer control system 102 can comprise various computer and/or computing-based elements described herein with reference to operating environment 1000 and FIG. 10. For example, in some embodiments, quantum computer control system 102 can further comprise memory 104, processor 106, and/or bus 111. In several embodiments, such computer and/or computing-based elements can be used in connection with implementing one or more of the systems, devices, components, and/or computer-implemented operations shown and described in connection with FIG. 1 or other figures disclosed herein.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), erasable programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or a combination of different central processing units, multi-core processors, microprocessors, dual microprocessors, microcontrollers, Systems on a Chip (SOC), array processors, vector processors, and any other type of processor. Further examples of processor 106 are described below with reference to processing unit 1014 and FIG. 10. Such examples of processor 106 can be employed to implement any embodiments of the subject disclosure.

According to multiple embodiments, memory 104 can store one or more computer and/or machine readable, writable, and/or executable components and/or instructions that, when executed by processor 106, can facilitate performance of operations defined by the executable component(s) and instruction(s). Further, in numerous embodiments, any suitable component associated with quantum computer control system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s).

For example, memory 104 can store computer and otherwise machine readable, writable, and/or executable components and/or instructions that, when executed by processor 106, can facilitate execution of the various functions described herein relating to quantum computer control system 102, relation determining component 127, operation time estimator 124, quantum computing device interface 105, and any other components associated with quantum computer control system 102 as described herein, with or without reference to the various figures of the subject disclosure.

In some embodiments, elements of quantum computer control system 102, including, but not limited to memory 104, processor 106, quantum computer control system 102, relation determining component 127, operation time estimator 124, quantum computing device interface 105, and/or another component of quantum computer control system 102 as described herein, can be communicatively, electrically, and/or operatively coupled to one another via bus 111 to perform functions of quantum computer control system 102, and any other components coupled therewith. In several embodiments, bus 111 can comprise one or more of a memory bus, memory controller, peripheral bus, external bus, local bus, or another type of bus that can employ various bus architectures. Further examples of bus 111 are described below with reference to system bus 1018 and FIG. 10. Such examples of bus 111 can be employed to implement any embodiments of the subject disclosure.

In some embodiments, quantum computer control system 102 can comprise any suitable type of component, machine, device, facility, apparatus, and/or instrument that comprises a processor and/or can be capable of effective and/or operative communication with a wired and/or wireless network. All such suitable embodiments are envisioned. For example, quantum computer control system 102 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of device.

In some embodiments, quantum computer control system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, quantum computer control system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN)

(e.g., the Internet) or a local area network (LAN). For example, quantum computer control system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, quantum computer control system 102 can thus include hardware (e.g., a central processing unit (CPU), a transceiver, a decoder), software (e.g., a set of threads, a set of processes, software in execution) or a combination of hardware and software that facilitates communicating information between quantum computer control system 102 and external systems, sources, and/or devices (e.g., computing devices, communication devices, etc.).

In an example, relation determining component 127, operation time estimator 124, quantum computing device interface 105, and/or any other components associated with quantum computer control system 102 as disclosed herein (e.g., communicatively, electronically, and/or operatively coupled with and/or employed by quantum computer control system 102), can comprise such computer and/or machine readable, writable, and/or executable component(s) and/or instruction(s). Consequently, according to numerous embodiments, quantum computer control system 102 and/or any components associated therewith as disclosed herein, can employ processor 106 to execute such computer and/or machine readable, writable, and/or executable component(s) and/or instruction(s) to facilitate performance of one or more operations described herein with reference to quantum computer control system 102 and/or any such components associated therewith.

For example, in some embodiments, relation determining component 127 can determine relation of a status signal of quantum computing device 175 to a noise value of the quantum computing device 175. In an additional operation, an operation time estimator 124 can estimate an operation time for the quantum computing device 175 based on the relation of the status signal of quantum computing device 175 to the noise value of the quantum computing device 175.

In some embodiments, quantum computer control system 102 can be associated with various technologies. For example, quantum computer control system 102 can be associated with classical computing technologies, quantum computing technologies, classical reinforcement learning technologies, quantum reinforcement learning technologies, classical artificial intelligence (AI) model technologies, quantum AI model technologies, classical machine learning (ML) model technologies, quantum ML model technologies, cloud computing technologies, Internet-of-Things (IoT) technologies, and/or other technologies.

In one or more embodiments, quantum computer control system 102 can employ hardware and/or software to solve problems that are highly technical in nature, including improving the fault tolerance of a quantum computer, implementing a checkpoint/restart system for quantum computer programs, remote management of quantum computer systems, and automated optimization of the computational cycles of a quantum computer, including processes to expand the time a quantum computer can execute quantum operations. One having skill in the relevant art(s), given the disclosure herein, would appreciate that the technical problems that can be solved by one or more embodiments described herein are not abstract and cannot be performed as a set of mental acts by a human.

Further, in certain embodiments, some of the processes performed can be performed by one or more specialized computers (e.g., one or more specialized processing units, a specialized computer such as tomography and reconstruction, statistical estimation, and so on) for carrying out defined tasks related to control and automated optimization of quantum computing systems. Quantum computer control system 102 and/or components of the system can be employed to solve new problems that arise through advancements in technologies mentioned above, computer architecture, and/or the like.

One or more embodiments of the quantum computer control system 102 can provide technical improvements to operations performed by quantum circuit systems, quantum processor systems, quantum computing systems, artificial intelligence systems, and/or other systems. One or more embodiments of the system can also provide technical improvements to operations performed by quantum processor (e.g., a superconducting quantum processor) by improving processing performance of the quantum processor, improving processing efficiency of the quantum processor, improving processing characteristics of the quantum processor, improving timing characteristics of the quantum processor, reducing the effect of electromagnetic signals interference, avoiding fault in the execution of quantum operations, and/or improving power efficiency of the quantum processor. All of the above-discussed quantum computer processors can be represented by QCD 175.

In addition to the technical improvements that can be provided by one or more embodiments described herein, embodiments described have practical application in the control of complex quantum computing systems. In implementations, one or more embodiments can engineer a combination of quantum operations, then design a time schedule for the use of quantum computing resources. For example, based on a combination of detected physical noise factors (e.g., vibration, electromagnetic waves, and frequency collisions), quantum operations of a program to be executed on QCD 175 can be individually analyzed and submitted for execution so as to minimize the effects of the physical noise factor on the execution of the program.

Further, one having skill in the relevant art(s), given the description herein, would appreciate that embodiments described herein are driven by efforts solve problems arising out of issues caused by the nature of new technology, e.g., managing and benefitting from new and powerful, yet occasionally error-prone quantum computing technology.

Figure 2:
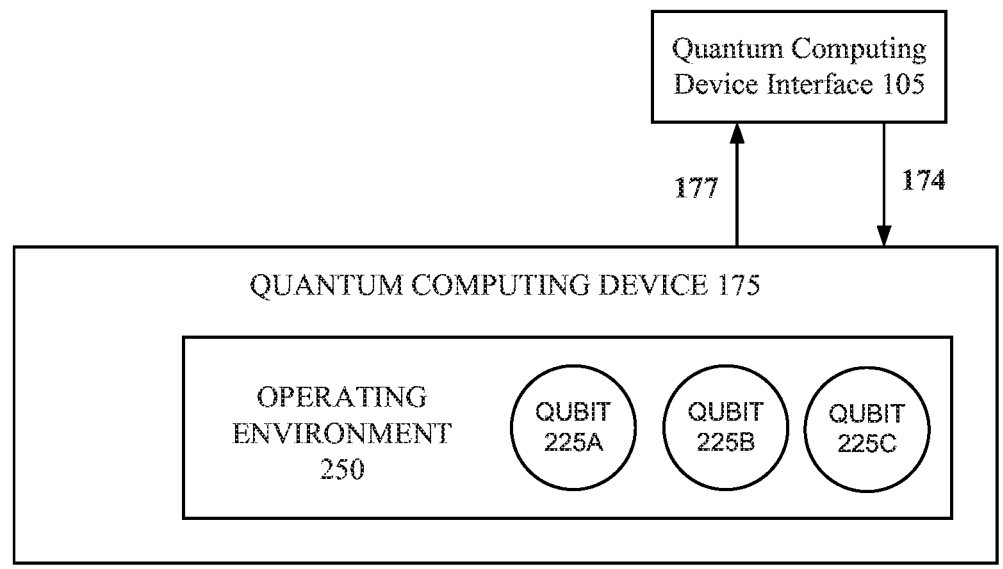
FIG. 2 illustrates a diagram of an example quantum computing device communicatively coupled to a quantum computer control system, in accordance with one or more embodiments.

FIG. 2 illustrates a diagram of an example 200 quantum computing device communicatively coupled to quantum computer control system 102, in accordance with one or more embodiments. Repetitive description of like elements and/or processes employed in respective embodiments is omitted for sake of brevity.

Example 200 includes quantum computing device 175 and quantum computing device interface 105. Quantum computing device 175 includes an operating environment 250 having qubits 225A-C. In one or more embodiments, quantum computing device 175 can perform computing tasks based on execution, by one or more of qubits 225A-C, one or more quantum operations. At the end of the execution of a quantum operation, in one or more embodiments, a state can be read from quantum computing device 175 that reflects the results of the performance of the quantum operation. In a computer task with more than one quantum operation, the state from an operation can be maintained and further manipulated by another operation.

In some implementations of quantum computing device 175, a classic computer can be used for a variety of configuration, input signal 174 and output signal 177 purposes. Quantum computer control system 102 is an example of a classic computer that can use quantum computer device interface for operating quantum computing device 175. As such, the configuration of qubits 225A-C to perform an operation, the providing of input for the operation, and the collecting of the output from the operation can be performed by quantum computer control system 102.

Figure 3:
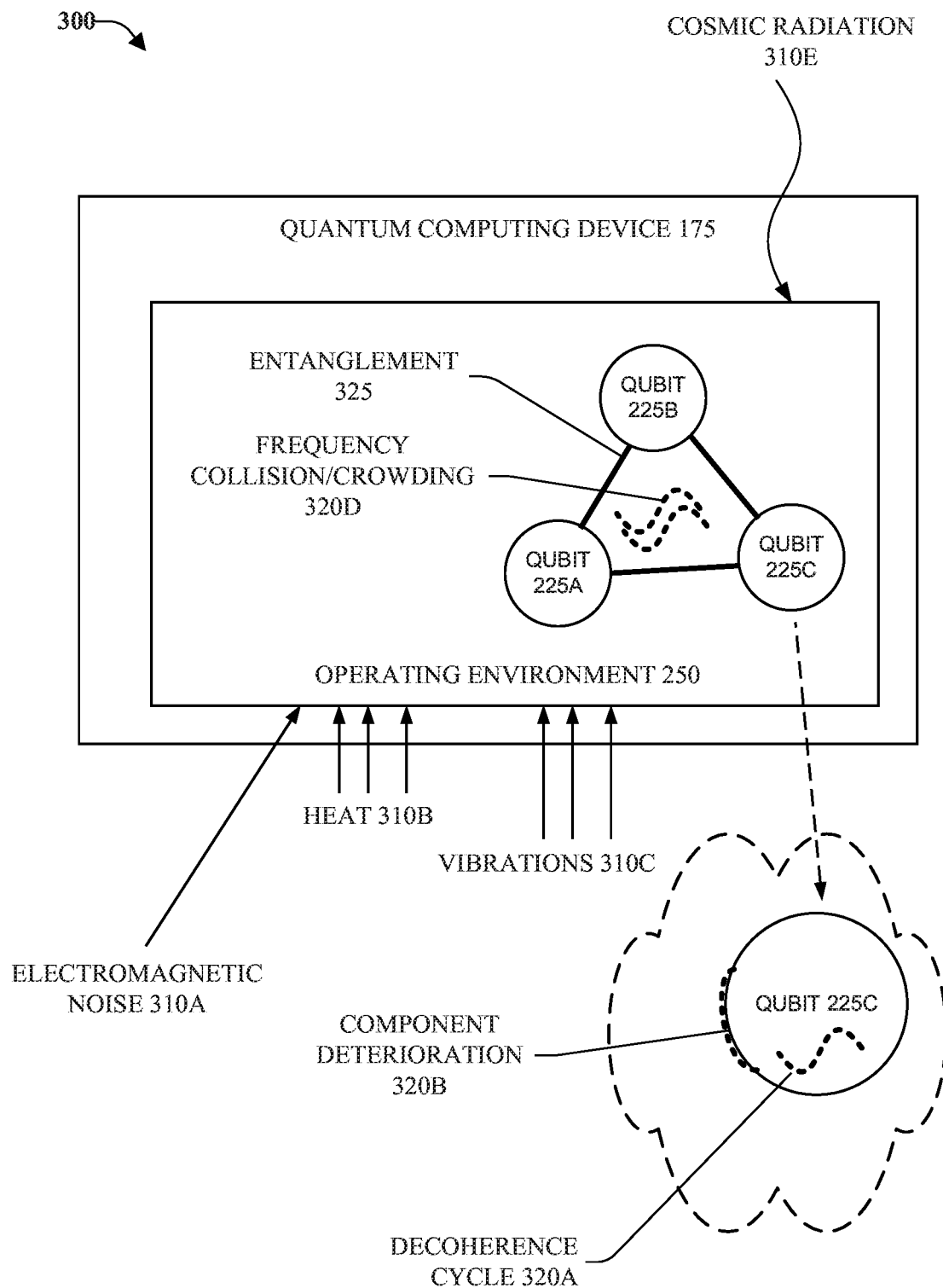
FIG. 3 illustrates example sources of noise that can interrupt operation of a quantum computing device, in accordance with one or more embodiments.
Figure 4:
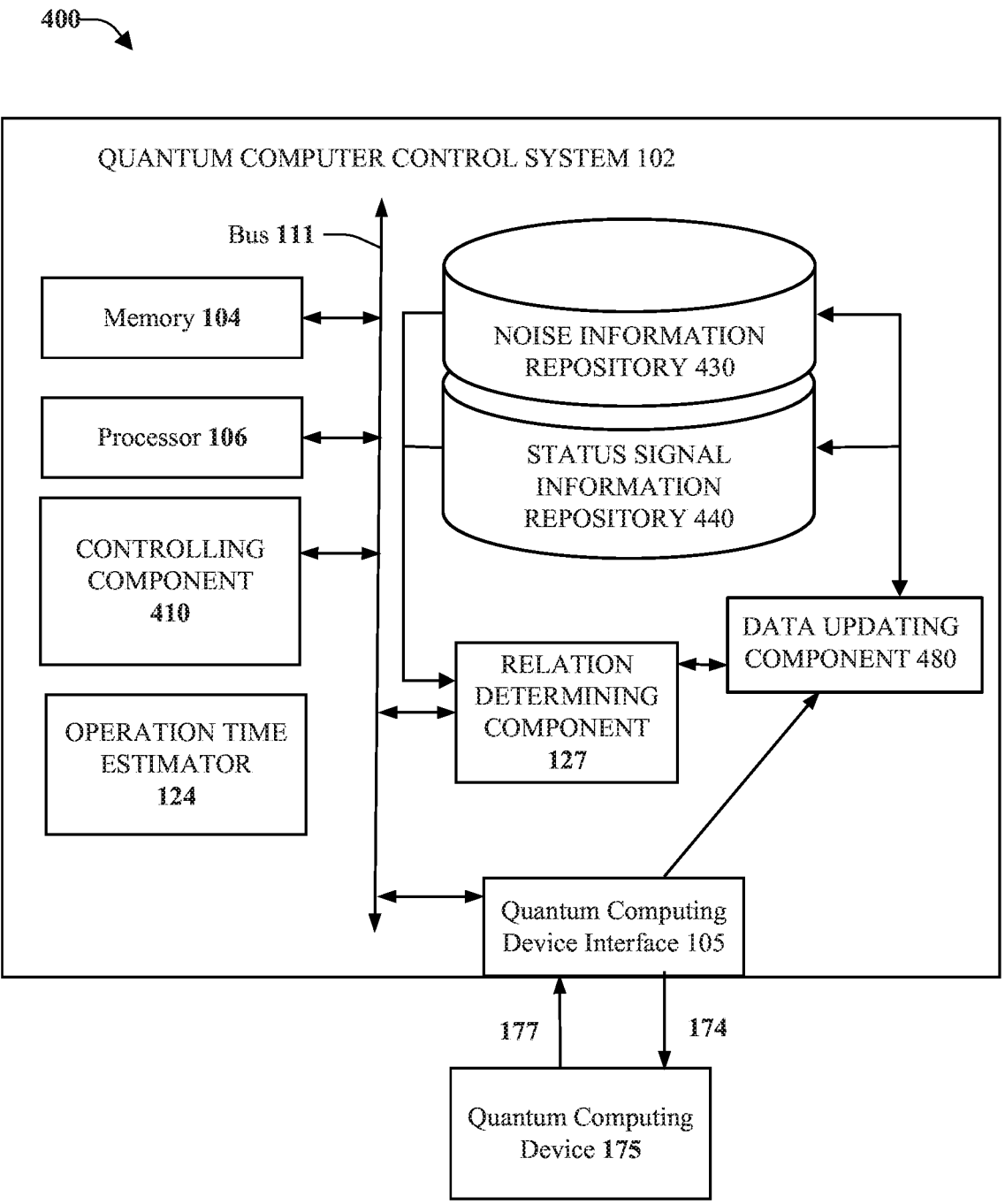
FIG. 4 illustrates a block diagram of an example, non-limiting quantum computer control system that can facilitate controlling a quantum computing device based on status signals and noise, in accordance with one or more embodiments described herein.

One or more embodiments can control quantum computing device 175 by determining if and when quantum computing device 175 is configured to perform a quantum operation, and when the command is commenced. One manner embodiments can determine whether to execute quantum operations is to compare a signal that indicates a status of the quantum computing device to a value corresponding to an amount of noise to which the execution of the quantum operation would be exposed. FIG. 3 provides examples of different noise sources that can interfere with operation of QCD 175. FIG. 4 describes different approaches to using the above analysis to make the determination of whether to operate QCD 175, e.g., from limited analysis of ambient noise at a particular time, to analysis of noise over time, as well as predictions about noise occurrences, based on past measurements. Further to this end, FIG. 6 describes embodiments that can use artificial intelligence and machine learning to improve the analysis.

FIG. 3 illustrates example 300 sources of noise that can interrupt operation of a quantum computing device, in accordance with one or more embodiments. Repetitive description of like elements and/or processes employed in respective embodiments is omitted for sake of brevity. As depicted, FIG. 3 includes quantum computing device 175 subjected to external sources of noise 310A-D and internal sources of noise 320A-C. QCD 175 includes operating environment 250 having a circuit of qubits 225A-C linked by entanglement 325. Qubit 225C is expanded to depicts two examples of internal noise 320A-B.

As illustrated by FIG. 3, one or more embodiments are described herein with noise being any factor that can interfere with the operation of QCD 175 at any level. In an example implementation, the noise value of the quantum computing device comprises the noise value representative of a magnitude of interference with a completion of a quantum operation by the quantum computing device.

As further used herein, noise is grouped into external sources 310A-E and internal sources. External sources 310A-E can be factors originating from outside QCD 175, e.g., electromagnetic noise 310A caused by a radiation source near QCD 175, and cosmic radiation 310E originating from an extra-terrestrial source. Other factors depicted include heat 310B and vibrations 310C. One having skill in the art, given the disclosure herein, would appreciate how these example factors, as well as other known factors and factors yet to be discovered, can be handled by one or more embodiments.

Another type of factor that can interfere with the operation of QCD 175 (e.g., noise), is noise that originates internally 320A-D, e.g., from components of QCD 175. An example of an internal noise factor is a deterioration of a component of QCD 175, e.g., component deterioration 320B of qubit 225C cause by exposure to different factors, over time. For example, qubit 225C deteriorates based on interference (e.g., frequency collision 320D) from qubit 225B or because an amount of time has elapsed.

An example of an internal noise factor that can be similar to the external factors described above is frequency collision/crowding 320D, e.g., interference by electromagnetic signals that can occur with any configuration, input, output, or operation of QCD 175. An example of this is the interference example noted above that caused a deterioration of qubit 225C, e.g., this same frequency collision can also cause interference with the operation of qubit 225A.

As depicted in FIG. 3, decoherence cycle 320A represents a different type of noise that, instead of occurring as an event, e.g., heat 310B and vibrations 310C can occur and not occur without any particular pattern. In this example, it is determined that qubit 225C can become operational and not operational at detectable intervals. For example, in accordance with a decoherence cycle of qubit 225C utilized by one or more embodiments, qubit 225C cycle between coherence and decoherence during a time frame, e.g., depending on implementation of qubit 225C, an example cycle can be 1 microsecond to 100 seconds or more to cycle between coherence and decoherence. As discussed further below, conditions of occurrence of different noise sources discussed above, can be detected, stored, and utilized for analysis by one or more embodiments For example, noise can interfere with operation of QCD 175 as a whole, such as when operating environment 250 is exposed to heat 310B, e.g., because of a refrigeration unit that contains QCD 175 (not shown). Drilling down a level, particular combinations of noise can affect multiple qubits 225A-C in or not in a quantum circuit, e.g., a groups of qubits 225A-B.

Further to this consideration of noise and QCD 175, noise can interfere with aspects of QCD 175 beyond qubits, e.g., the operation of entanglement 325 can be affected by noise. In addition to those depicted in FIG. 3, signals used to convey configuration of quantum operations can also be affected by noise, e.g., microwave signals originating at quantum computing device interface 105 to configure qubits 225A-B as a quantum circuit have their effect on the target qubits altered. Other signals that can be affected by noise and analyzed by embodiments include input signal 174 and output signal 177, e.g., affecting input from a previous quantum operation or output of the results of program execution.

Based at least on the foregoing discussion of FIG. 3, one having skill in the relevant art(s), given the disclosure herein would appreciate that one or more embodiments can analyze effects of a variety of different noise factors, on individual or combinations of signals and components that operate QCD 175.

FIG. 4 illustrates a block diagram of an example 400, non-limiting quantum computer control system 102 that can facilitate controlling a quantum computing device based on status signals and noise, in accordance with one or more embodiments described herein. The example 400 implementation depicted in FIG. 4 includes quantum computer control system 102 and quantum computing device 175.

According to multiple embodiments, memory 104 can store one or more computer and/or machine readable, writable, and/or executable components and/or instructions that, when executed by processor 106, can facilitate performance of operations defined by the executable component(s) and instruction(s). For example, memory 104 can store computer and otherwise machine readable, writable, and/or executable components and/or instructions that, when executed by processor 106, can facilitate execution of the various functions described herein relating to quantum computer control system 102, such as relation determining component 127, operation time estimator 124, quantum computing device interface 105, controlling component 410, data updating component 480, and any other components associated with quantum computer control system 102 as described herein, with or without reference to the various figures of the subject disclosure. Noise information repository 430 and status signal information repository 440 are communicatively coupled to relation determining component and data updating component 480.

In one or more embodiments a series of one or more related quantum operations (e.g., a quantum program) is sought to be executed by quantum computing device 175. Considering the first quantum operation, relation determining component 127 can, for the first quantum operation, determine relation of a status signal of quantum computing device 175 to a noise value of the quantum computing device. In some implementations, this relation can be the ratio of a magnitude of the status signal for the first quantum operation to a magnitude of a noise value for the first quantum operation, e.g., the significance of the status signal is reduced by the magnitude of the noise value.

Based on this relation, an operation time for QCD 175 with respect to the first quantum operation can be determined, e.g., by operation time estimator 124. In some embodiments, this operation time can be a starting time for a coherence period T2 of the operation components of QCD 175 that would be used to perform the first quantum operation. In other embodiments, this operation time can be a length of time the QCD 175 that the operation components are predicted to remain coherent once the operation is commenced. Other time values can also be generated by one or more embodiments of operation time estimator 124, including the predicted execution time of the first operation, given the ratio of status signal magnitude to noise value magnitude. One having skill in the relevant art(s), given the description herein, would appreciate how additional time values can be generated based on the analysis described.

As described above, one approach that can be used to determine the operating time of the first quantum operation is to identify both a status signal magnitude and a noise value. Considering the identification of the status signal value, one way is to measure and analyze the ambient status of the operating components, that is the current status at a time before a planned execution time. One approach to measuring this current status can assess a contemporaneous execution of a different quantum operation, and generate a status signal based on the result, e.g., factors including the extent to which execution completed successfully, with expected results, within an expected period of time. In other embodiments, signal value can be generated to be representative of a capability to complete a quantum operation by the quantum computing device. One having skill in the relevant art(s), given the description herein will appreciate different approaches to assessing a current status of the operation components.

One approach that one or more embodiments can use to potentially improve the accuracy of the status signal is to combine current status indicators such as discussed above, with historical status indicators collected over time. One approach to providing historical status indicators for this analysis is to collect and store information including, but not limited to, the indicators considered, the status value determined based on the indicators, and the corresponding results of executing the quantum operation with identified operation components of QCD 175. Thus, in this approach, an analysis can be performed that assesses factors including, the historical performance of the operation components, given the current conditions, operation component similar to the current operation components, conditions similar to the current conditions, as well as other useful historical information.

In the example depicted in FIG. 4, the use of this stored information is facilitated by the communicative coupling of relation determining component 127 to status signal information repository 440. Further, in this example, when relation determining component gathers current and historical indicators for status signal determination, this information, as well as the determined status signal value can be conveyed to data updating component 480. Then, in one or more embodiments, when results are received by quantum computing device interface 105, these can be stored, along with the information from relation determining component 127, in status signal information repository 440.

Turning to an identification of noise value by relation determining component 127, one or more embodiments can employ a process similar to the example process used for the determination of the status signal described above. Thus, in one approach, current noise factors can be collected an analyzed, e.g., including, but not limited to, as described with FIG. 3, vibrations 310C of the quantum computing device, frequency collisions 320D among signals utilized by the quantum computing device, crowding of signals utilized by the quantum computing device, electromagnetic noise 310A to which the quantum computing device is subject, heat 310B to which the QCD is exposed, component deterioration 320B, or cosmic radiation to which quantum computing device 175 is subjected.

A noise factor which can, in some circumstances, be important to the determination of a noise value, as discussed with FIG. 3 above, is decoherence cycle 320A, e.g., a time cycle where qubit 225B transitions into and out of coherence. In one or more embodiments, when a decoherence cycle 320A is identified for an operation component, along with an identification of the location of the current and future times within the cycle, useful information about current and future decoherence times can be incorporated into the determination of the noise value.

In alternative embodiments, if a decoherence cycle 320A has not been identified for an operation component, storing coherence data in noise information repository 430 and using this data to analyze additional quantum operations. In addition to the usefulness of this information as described above, in one or more embodiments, analyzing historical coherence data stored, for example, in noise information repository 430, can facilitate the identification of an undetermined decoherence cycle 320A.

It should be appreciated that alternative embodiments can be implemented using a different determining factor than the relation of status signal to noise value. It should also be noted that, in some circumstances an estimation of operation time by operation time estimator 124 can be facilitated by applying one or more thresholds to the ratio of status signal to noise value. In an example, based on an assessment of the costs of an inaccurate operation time, a threshold can be applied to ratios utilized that are utilized by operation time estimator 124 to estimate an operation time. For example, to reduce a likelihood of the estimation of an inaccurate operation time, a threshold requiring for consideration a ratio greater than two, can be increased to a ratio greater than three.

Figure 5:
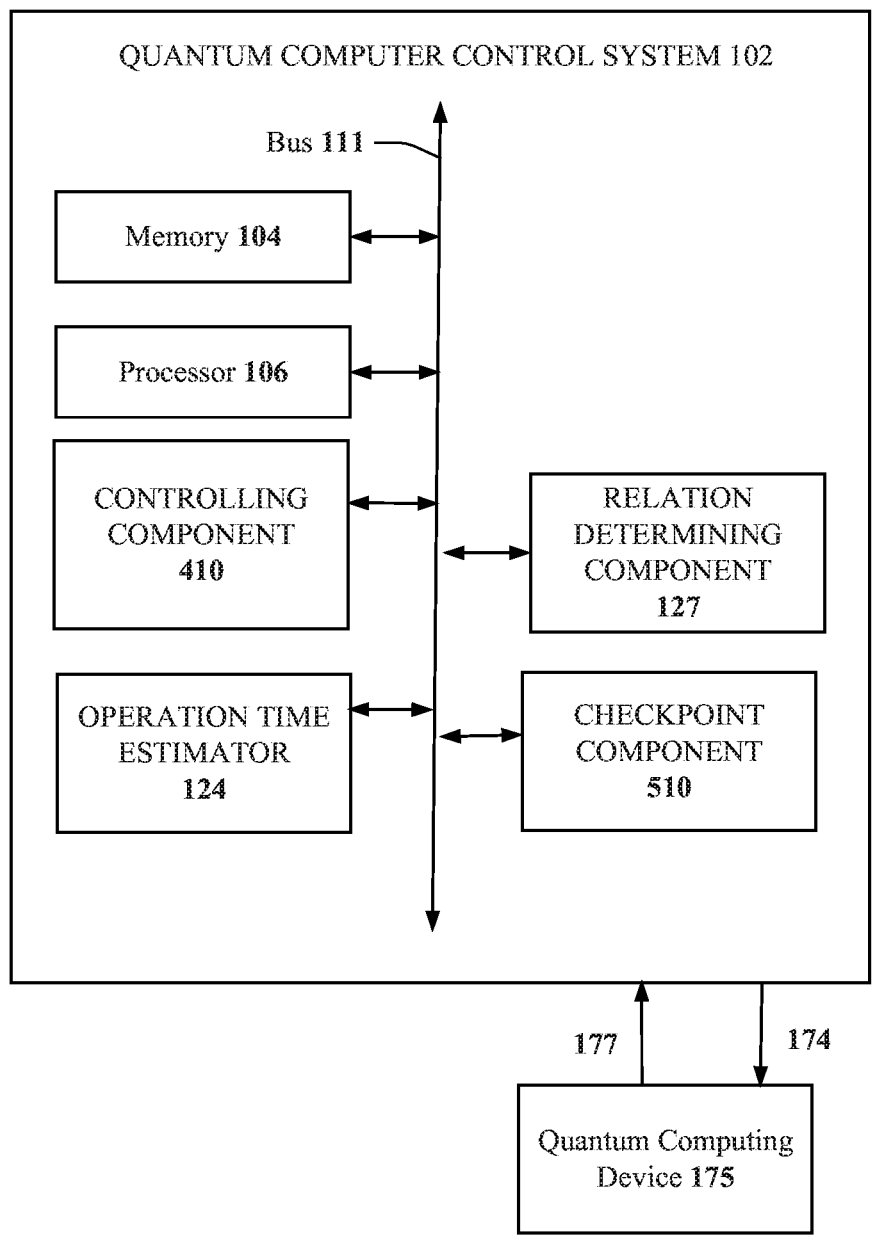
FIG. 5 a block diagram of an example non-limiting quantum computer control system that can facilitate controlling a quantum computing device with checkpoints and restoring features, in accordance with one or more embodiments described herein.

FIG. 5 a block diagram of an example 500, non-limiting quantum computer control system 102 that can facilitate controlling a quantum computing device with checkpoints and restoring features, in accordance with one or more embodiments described herein. The example 100 implementation depicted in FIG. 1 includes quantum computer control system 102 and quantum computing device 175.

It should be noted that, as described further below, one or more embodiments can, for a quantum program with multiple quantum operations, utilize controlling component 410 to pause the execution of the program. This pausing operation can be combined with the generating of operation time discussed above, to provide additional ways to control the operation of QCD 175. For example, if the operating duration of quantum components associated with multiple associated quantum operations (e.g., a quantum program), are known, then, in some circumstances, one or more embodiments can develop a timeline for how long the quantum program will take to complete execution, and a break own of when, and for how long, each quantum operation of the program executes.

While this timeline can provide useful information about the execution of quantum programs, this information can also enhance some of the features described above. In one enhancement, one or more embodiments can determine, not only operation time of individual quantum operations being executed, but also collection of related quantum operation to be performed over time. For example, assuming that four quantum operations each takes 10 ms to complete execution, and noise analysis predicts that the current coherence time for components required for operation all of the related quantum operations can be described by a 25 ms decoherence cycle 320A. Based upon this sample data, one or more embodiments can make a determination not to launch the program, e.g. because the required components are predicted to cycle into decoherence before the completion of all four operations. When considering this midprogram decoherence, it should be noted that, some quantum computing operations produce their results by changing the state of a quantum component, e.g., a state vector comprising multiple qubits, that can be read by different processes. It should be noted that, when collections of quantum components are used to temporarily store result data, if decoherence occurs the data can be lost.

One way to address this, used by one or more embodiments, uses the pausing operation described above to engineer execution breaks to avoid predicted decoherence. Thus, returning to the example above, one or more embodiment can engineer a schedule where the first two quantum operations execute (e.g., requiring 20 ms) and a pause in the execution is specified until, based on the 25 ms cycle, the predicted decoherence ends, e.g., at 51 ms, where the second set of operations can be executed, without decoherence issues.

Checkpoint component 510 can provide additional features that can be employed by one or more embodiments to further promote the execution of multiple, related quantum operations. One or more embodiments can, at the time of pausing the submission of a series of multiple, relate quantum operations, automatically gather relevant state data and store the data for restoring operation of the program after a pause is ended, e.g., at 51 ms in the example above.

Returning to the example above, in the operations discusses above, a four operation program was specified to be paused between the second and the third quantum operations, e.g., to avoid predicted decoherence. Without a checkpoint however, any state data generated by the second quantum operation to be passed on to the third quantum operation can be lost during the pausing. By using a checkpoint with the pause operation specified in the example, when the pause occurs the state data of the completed second operation is retrieved and stored, e.g., using quantum computer control system 102. Then, when the required components cycle back into coherence, and operation of the program is resumed, the state data of the second operation can be accessed by the third operation, e.g., to facilitate the use of the restored data by the third operation, as specified. It should be appreciated that these additional pausing, resuming, checkpointing, and restoring, can provide one or more embodiments with additional ways to improve the operation of QCD 175.

One or more embodiments can also use checkpointing component 510 to adapt the operation of QCD 175 to additional types noise interference. As discussed with FIG. 3 above, certain types of noise can cause unexpected decoherence of a quantum computing device components, e.g., cosmic radiation 310E, electromagnetic noise 310A, and other similar types of noise. Thus, returning to the example discussed above, if decohering cosmic radiation 310E unexpectedly occurs between the completion of the first operation and the beginning of the second operation, state data generated by the first operation for use by the second operation can lost to the sudden decoherence.

To address this problem, one or more embodiments can trigger automatic pausing and checkpointing if a high noise value is detected, e.g., based on the complex analysis of current and historical data by relation determining component described above. Thus, returning to the example, after the first operation has updated a state vector with results for the second operation, one or more embodiments predict a sudden decoherence will occur before the completion of the second operation. In accordance with one or more embodiments, this event triggers a pause in the execution of the second operation and the retrieval and storage of the state data generated by the first operation. Finally, when sufficient coherence is predicted by one or more embodiments to resume execution of the program, the stored checkpoint data can be restored for use by the second operation.

Figure 6:
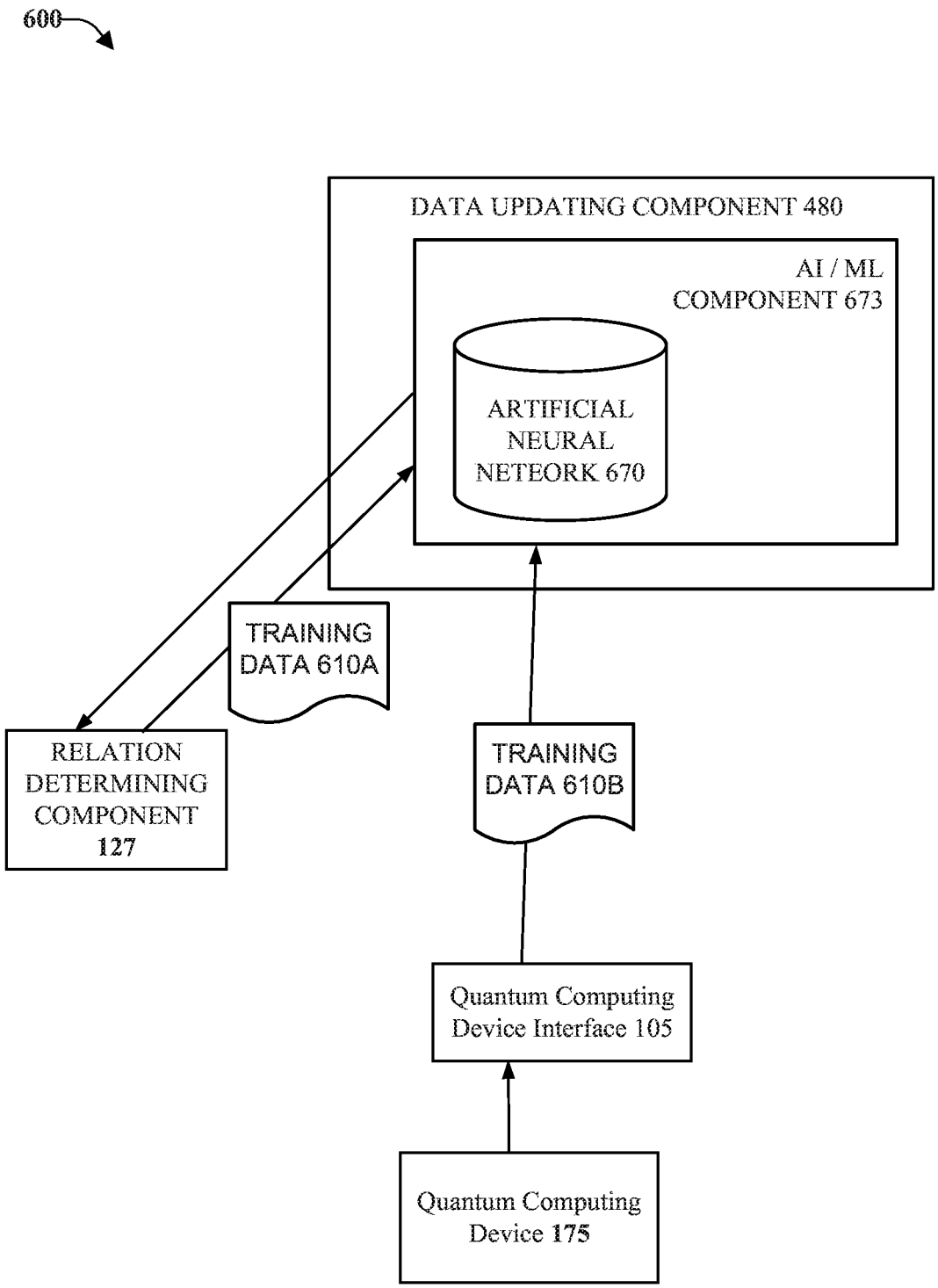
FIG. 6 illustrates an implementation of an example, non-limiting system 600 that can facilitate controlling a quantum computing device by employing an artificial intelligence (AI)/machine learning (ML) component, in accordance with one or more embodiments described herein.

FIG. 6 illustrates an implementation of an example, non-limiting system 600 that can facilitate control, by controlling component 410, of a quantum computing device by employing an artificial intelligence (AI)/machine learning (ML) component 673, in accordance with one or more embodiments described herein. In one or more embodiments, AI/ML component 673 can include an example artificial neural network (ANN) (also termed neural network herein) 670. Repetitive description of like elements and/or processes employed in respective embodiments is omitted for sake of brevity.

In certain embodiments, status signals and noise values can be evaluated based on classifications, correlations, inferences and/or expressions associated with principles of artificial intelligence. For example, AI/ML component 673 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, etc. In some embodiments, one or more of the AI/ML approaches noted herein can be applied to evaluating complex combinations of operation component statuses, noise factors, and results of past selections.

In another aspect, AI/ML component 673 can perform a set of machine learning computations associated with the control of QCD 175. For example, AI/ML component 673 can perform reinforcement learning analysis, a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and a set of different machine learning computations to analyze QCD data described herein, and engineer time and resource combinations that can be directed to different goals, e.g., speed, lower-cost, energy efficiency, equipment longevity, etc.

In an example AI/ML approach that can be utilized by one or more embodiments, ANN 670 can be optimized (also termed "trained" herein) by submitting optimizing data to the network. In this alternative embodiment, data updating component 480 of FIG. 4, used to store noise and status signal information in respective repositories 430 and 440, can be comprised of AI/ML component 673, e.g., as depicted in FIG. 4. It should be noted that this description of employing an ANN is non-limiting, e.g., one or more embodiments can use other types of machine learning algorithms that receive input and perform analysis, e.g., as described above.

In one or more embodiments, to facilitate the use of ANN 670 for analysis of operating QCDs, training data 610A-B can combine operational data from relation determining component 127 with confirmed conclusions about the operational data, e.g., results provided by quantum computing device interface 105. For example, in one or more embodiments, operational data can include the sensor data that was evaluated, the status signal, the noise value, and other determinations based on the sensor data. In one more embodiments, to facilitate training ANN 670, the action selected based on the operational data (e.g., submitting a quantum operation for processing), as well as the results of the decision, e.g., different measurements of errors or sub-optimal results As would be appreciated by one having skill in the relevant art(s), given the description herein, training data 610A-B can be used to train the artificial neurons of ANN 670 such that, over time, ANN 670 can accurately analyze quantum computing activity and produce reports on different system components.

Figure 7:
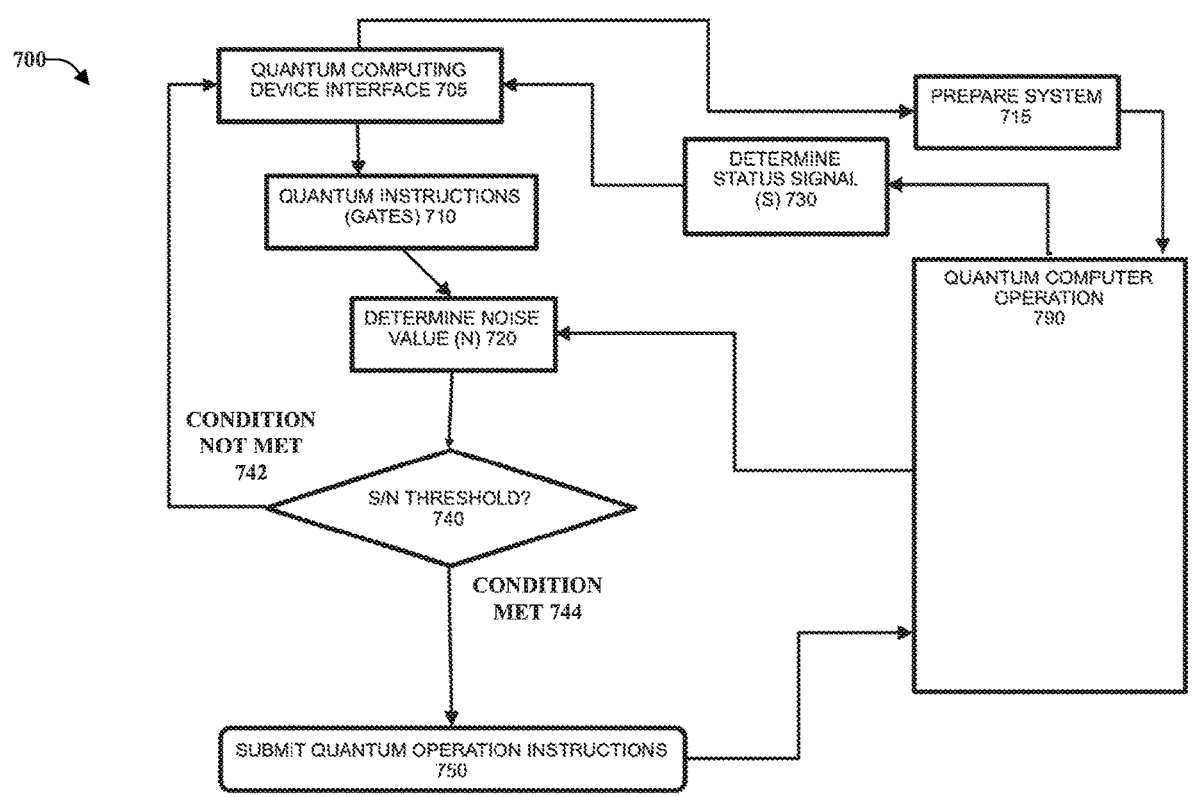
FIG. 7 includes an example pseudocode that can implement one or more embodiments.

Because FIGS. 7-8 relate to a non-limiting example embodiment based on different aspects of the disclosure herein, these figures are discussed together below. FIG. 7 includes an example flowchart 700 that describes a system that can facilitate the control of QCD 175, in accordance with one or more embodiments. FIG. 8 lists example pseudocode 800 that can implement aspects of the system of example flowchart 700, in accordance with one or more embodiments. Repetitive description of like elements and/or processes employed in respective embodiments is omitted for sake of brevity.

At 705 in FIG. 7, in one or more embodiments, quantum computing interface can start the process of executing a series of quantum instructions using a quantum computer at 790, discussed below. At 705 in FIG. 8 a corresponding pseudocode operation initializing the process described above. For example, at 790, in one or more embodiments, quantum computing interface 105 can be used to start the process of executing a series of quantum instructions using QCD 175.

At 715, in one or more embodiments, the QCD can be prepared for execution of the selected quantum operations. In pseudocode 800 of FIG. 8, 715 labels a code statement that performs a corresponding operation, e.g., preparing the system. For example, at 715, in one or more embodiments, QCD 175 can be prepared for execution of the selected quantum operations.

At 730, in one or more embodiments, a status signal (S) 730 can be identified form different sources. As described with FIGS. 3-4 above, one or more embodiments can determine a magnitude of a status signal. At 730 in FIG. 8, a statement to read a qubits status is included. For example, at 730, in one or more embodiments, QCD 175 can be prepared for execution of the selected quantum operations.

At 710, in one or more embodiments, quantum instructions can be identified that can create quantum gates needed to perform the quantum operation. In pseudocode 800 at 710, instructions are compiled for the creation of quantum gates. At 720, in one or more embodiments, a noise value can be determined, in part, from information received from QCD 175 and from other sources, e.g., sensors to measure vibrations 310C, sensors to measure heat 310B, etc. At 720 in pseudocode 800, noise for a quantum chip can be estimated, e.g., a quantum chip being, in one or more embodiments, collection of qubits integrated in microchip form.

In 740, in one or more embodiments, the S/N ratio can be computed, and the resulting ratio value can be compared to a threshold. In 740 of pseudocode 800, the ratio is computed and compared to a threshold of one (1). As depicted in flowchart 700, and pseudocode 800, when threshold condition is met 744 (e.g., S>1) the operations move to an additional status check, between 740 and 750 in pseudocode 800, that has been omitted from flowchart 700, this status check being different from the status signal analysis of 730. From this omitted section, block 750, discussed below, can be implemented.

When the threshold condition is not met 742 (e.g., S<=1), the process can return to block 705, where quantum computing interface 105 can receive an updated status signal (S) 730, and the checking process can continue until conditions are sufficient to move to block 750.

At 750, in one or more embodiments, the gate operation instructions that were included in 710 above can be submitted to quantum computer operation 790 for processing. At 750 of FIG. 8, quantum gates are submitted for execution by QCD 175. At 790, in one or more embodiments, quantum computer operation 790 can be utilized to perform the quantum operations identified above, in accordance with one or more embodiments.

Figure 9:
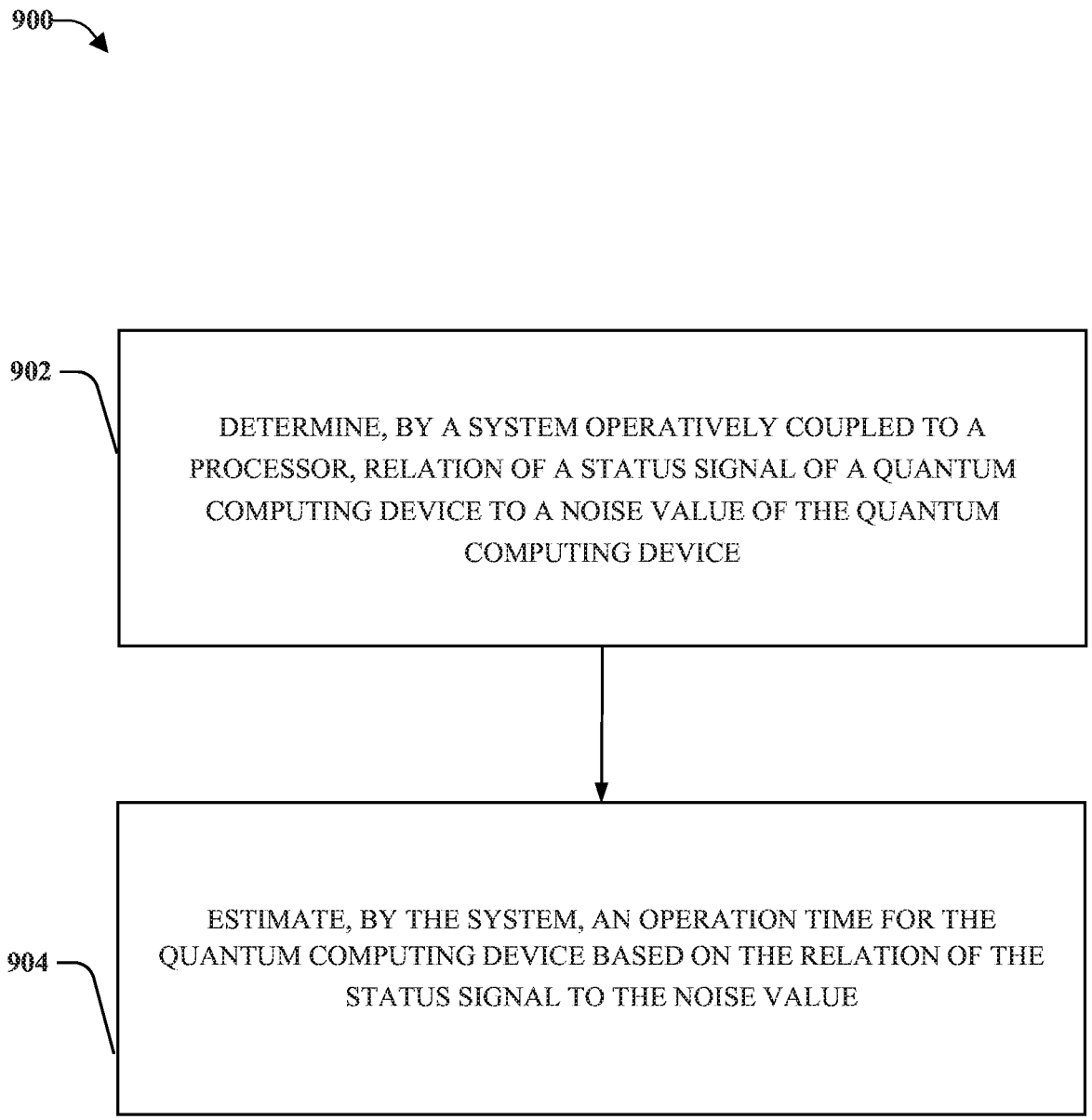
FIG. 9 illustrates a flow diagram of an example, non-limiting computer-implemented method that can facilitate controlling a quantum computing device based on status signals and noise, in accordance with one or more embodiments described herein.

FIG. 9 illustrates a flow diagram of an example, non-limiting computer-implemented method 900 that can facilitate controlling the operation of elements of QCDs, in accordance with one or more embodiments described herein.

At 902, method 900 can comprise determining, by a system operatively coupled to a processor, relation of a status signal of a quantum computing device to a noise value of the quantum computing device. For example, in one or more embodiments, a method can determine, by relation determining component 127 of quantum computer control system 102, operatively connected to processor 106, relation of a status signal of a quantum computing device 175 to a noise value of the quantum computing device, e.g., described at 730 of FIGS. 7 and 8.

At 904, method 900 can comprise, estimating, by the system, an operation time for the quantum computing device based on the relation of the status signal to the noise value. For example, in one or more embodiments, quantum computer control system 102 can estimate an operation time, e.g., by operation time estimator 124, for quantum computing device 175 based on the relation, determined by relation determining component 127, of the status signal of the quantum computing device to the noise value of quantum computing device 175.

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
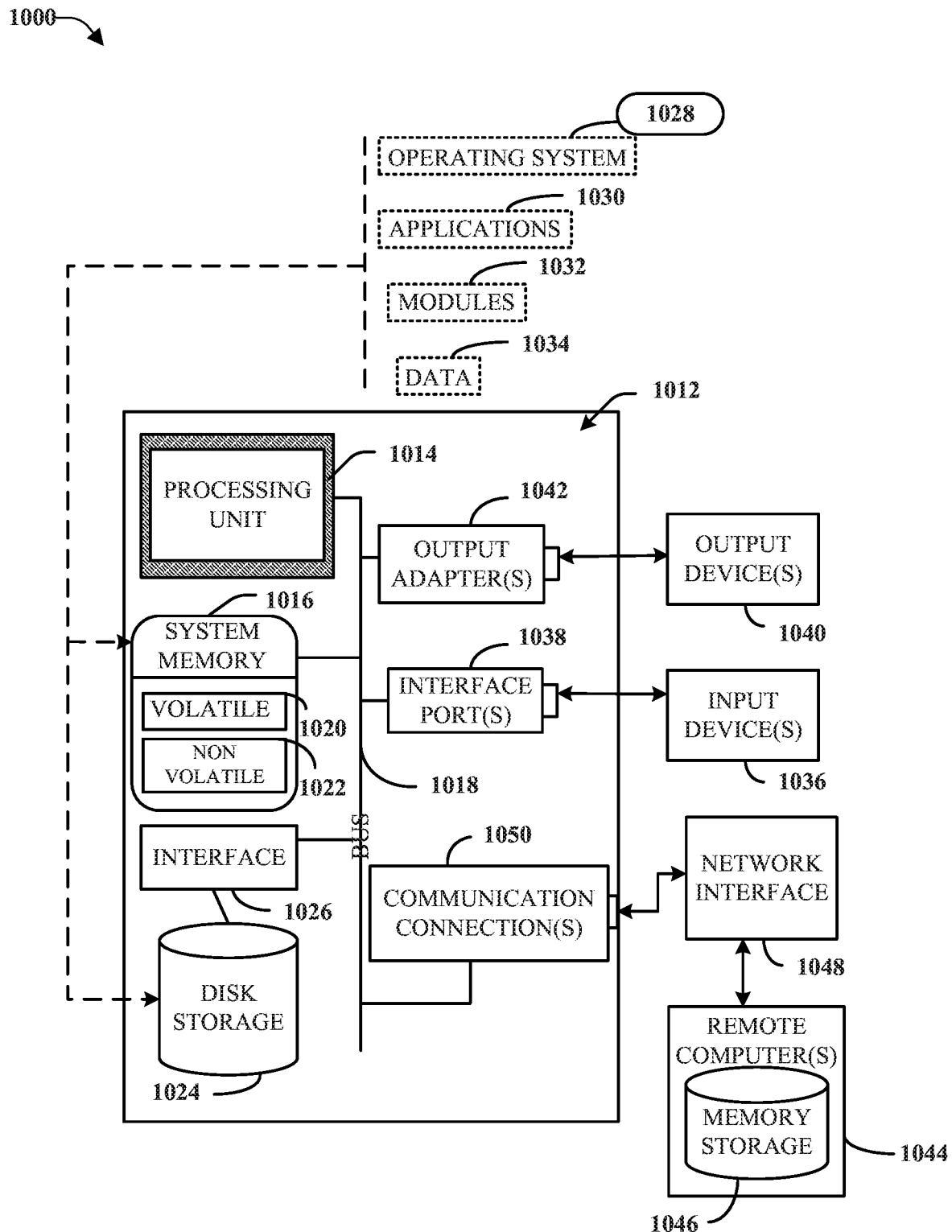
FIG. 10 illustrates a block diagram of an example, non-limiting operating environment in which one or more embodiments described herein can be facilitated.

FIG. 10 can provide a non-limiting context for the various aspects of the disclosed subject matter, intended to provide a general description of a suitable environment in which the various aspects of the disclosed subject matter can be implemented. As depicted, FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A system, comprising:
a memory that stores computer executable components; and
a processor that executes the computer executable components stored in the memory, wherein the computer executable components comprise:

a relation determining component that determines relation of a status signal of a quantum computing device to a noise value of the quantum computing device;

an operation time estimator that estimates an operation time for the quantum computing device based on the relation of the status signal to the noise value;

a controlling component that controls the quantum computing device based on the operation time for the quantum computing device; and comprise a checkpointing component that generates checkpoint data representing a state of the quantum computing device at a time of pausing commencing of a quantum operation.

2. The system of claim 1, wherein the operation time estimator estimates the operation time for the quantum computing device based on a comparison of the relation of the status signal to the noise value to a threshold.

3. The system of claim 1, wherein the status signal comprises a signal value representative of capability to complete a quantum operation by the quantum computing device.

4. The system of claim 1, wherein the noise value is representative of a magnitude of interference with completion of a quantum operation by the quantum computing device.

5. The system of claim 4, wherein the noise value is based on external noise associated with one or more of: physical connections to the quantum computing device, vibrations of the quantum computing device, frequencies of collisions among signals utilized by the quantum computing device, crowding of signals utilized by the quantum computing device, electromagnetic noise to which the quantum computing device is subject, or cosmic radiation to which the quantum computing device is subjected.

6. The system of claim 4, wherein the interference comprises interference from a decoherence cycle of the quantum computing device.

7. The system of claim 4, wherein the interference comprises interference from an external source to which the quantum computing device is subjected.

8. The system of claim 4, wherein the noise value is based on a noise information repository for the quantum computing device.

9. The system of claim 8, wherein the system further comprises a machine learning component, and wherein the noise information repository comprises a neural network updated by the machine learning component based on the noise value, the status signal, and a result of the quantum operation performed by the quantum computing device.

10. The system of claim 1, wherein the operation time estimator estimates the operation time for a qubit of the quantum computing device.

11. The system of claim 1, wherein the operation time estimator estimates the operation time for a connection between two qubits of the quantum computing device.

12. The system of claim 11, wherein the controlling component controls the quantum computing device by operations comprising the pausing the commencing of the quantum operation by the quantum computing device, based on the operation time for the quantum computing device.

13. The system of claim 12, wherein the controlling component further controls the quantum computing device by operations further comprising resuming operation of the quantum computing device based on the operation time for the quantum computing device.

14. The system of claim 1, wherein the resuming the operation of the quantum computing device is facilitated by the checkpoint data.

15. The system of claim 1, wherein the pausing the operation of the quantum computing device comprises pausing the operation of the quantum computing device to reduce a likelihood of a computation cycle fault in the operation of the quantum computing device.

16. The system of claim 1, wherein the relation of the status signal to the noise value comprises a ratio of a value corresponding to the status signal to the noise value.

17. The system of claim 1, wherein the estimated operation time of the quantum computing device comprises an estimated coherence time of the quantum computing device.

18. A computer-implemented method, comprising:

determining, by a system operatively coupled to a processor, a relation of a status signal of a quantum computing device to a noise value of the quantum computing device; and estimating, by the system, an operation time for the quantum computing device based on the relation of the status signal to the noise value;

controlling, by the system, the quantum computing device based on the operation time for the quantum computing device; and generating, by the system, checkpoint data representing a state of the quantum computing device at a time of pausing commencing of a quantum operation.

19. The computer-implemented method of claim 18, further comprising, controlling, by the system, the quantum computing device based on the operation time for the quantum computing device.

20. The computer-implemented method of claim 19, wherein the controlling the quantum computing device comprises the pausing the commencing of the quantum operation by the quantum computing device, based on the operation time for the quantum computing device.

21. A computer program product for controlling a quantum computing device, the computer program product comprising a computer readable storage medium having program instructions embodied therewith, the program instructions executable by a processor to cause the processor to:

determine, by the processor, relation of a status signal of a quantum computing device to a noise value of the quantum computing device;

estimate, by the processor, an operation time for the quantum computing device based on the relation of the status signal to the noise value;

controlling, by the processor, the quantum computing device based on the operation time for the quantum computing device; and generating, by the processor, checkpoint data representing a state of the quantum computing device at a time of pausing commencing of the a quantum operation.

22. The computer program product of claim 21, wherein the program instructions further cause the processor to control, by the processor, the quantum computing device based on the operation time for the quantum computing device.

23. The computer program product of claim 22, wherein the controlling the quantum computing device comprises the pausing the commencing of the quantum operation by the quantum computing device, based on the operation time for the quantum computing device.

* * * * *